US009245369B2

(12) United States Patent
Joo et al.

(10) Patent No.: US 9,245,369 B2
(45) Date of Patent: Jan. 26, 2016

(54) METHOD AND APPARATUS FOR GENERATING AN AVATAR

(75) Inventors: Sang hyun Joo, Daejeon (KR); Il kwon Jeong, Daejeon (KR); Byoung tae Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 210 days.

(21) Appl. No.: 13/808,619

(22) PCT Filed: Jul. 5, 2011

(86) PCT No.: PCT/KR2011/004920
§ 371 (c)(1),
(2), (4) Date: Jan. 7, 2013

(87) PCT Pub. No.: WO2012/005501
PCT Pub. Date: Jan. 12, 2012

(65) Prior Publication Data
US 2013/0106867 A1    May 2, 2013

Related U.S. Application Data

(60) Provisional application No. 61/361,862, filed on Jul. 6, 2010, provisional application No. 61/365,705, filed on Jul. 19, 2010, provisional application No. 61/365,694, filed on Jul. 19, 2010.

(30) Foreign Application Priority Data

Nov. 2, 2010 (KR) .......................... 10-2010-0108415

(51) Int. Cl.
*G06T 13/00* (2011.01)
*G06T 13/40* (2011.01)
*A63F 13/00* (2014.01)

(52) U.S. Cl.
CPC ................. *G06T 13/00* (2013.01); *A63F 13/00* (2013.01); *G06T 13/40* (2013.01)

(58) Field of Classification Search
CPC .......... A63F 13/00; G06T 13/00; G06T 13/40
See application file for complete search history.

(56) References Cited

U.S. PATENT DOCUMENTS

| 2005/0234782 | A1* | 10/2005 | Schackne et al. ............... 705/27 |
| 2006/0174315 | A1  | 8/2006  | Kim et al. |
| 2009/0150802 | A1  | 6/2009  | Do et al. |
| 2010/0009747 | A1* | 1/2010  | Reville et al. ................... 463/31 |
| 2011/0252344 | A1* | 10/2011 | Van Os .......................... 715/763 |

FOREIGN PATENT DOCUMENTS

| KR | 10-2000-0054547 | 9/2000 |
| KR | 10-2001-0084996 | 9/2001 |

(Continued)

OTHER PUBLICATIONS

International Search Report dated Jun. 2, 2012 in PCT/KR2011/004920.

*Primary Examiner* — Kee M Tung
*Assistant Examiner* — Frank Chen
(74) *Attorney, Agent, or Firm* — Staas & Halsey LLP

(57) ABSTRACT

Disclosed herein are a method and an apparatus for creating an avatar. The method for creating an avatar according to an exemplary embodiment of the present invention includes receiving information on an appearance of an object to be created into an avatar; generating avatar appearance type metadata using the information on the appearance; creating the avatar using the avatar appearance type metadata, wherein the avatar appearance type metadata include at least one of skin information, hair information, nails information, and teeth information. The exemplary embodiments of the present invention can create the avatar capable of facilitating the differentiation with another avatar while more approximating the reality, by adding more detailed data in addition to the data for the existing appearance so as to generate the avatar.

22 Claims, 6 Drawing Sheets

(56) References Cited

FOREIGN PATENT DOCUMENTS

| KR | 10-2006-0020999 | 3/2006 |
| KR | 10-2006-0080349 | 7/2006 |
| KR | 1020060087793 | 8/2006 |
| KR | 10-2010-0121420 | 11/2010 |

* cited by examiner

METHOD AND APPARATUS FOR GENERATING AN AVATAR

CROSS REFERENCE TO RELATED APPLICATIONS

This application claims the benefit under 35 U.S.C. Section 371, of PCT International Application No. PCT/KR2011/004920, filed Jul. 5, 2011, which claimed priority to U.S. application Ser. No. 61/361,862, filed Jul. 6, 2010, U.S. application Ser. No. 61/365,694, filed Jul. 19, 2010, U.S. application Ser. No. 61/365,705, filed Jul. 19, 2010, and Korean Patent Application No. 10-2010-0108415, the disclosures of which are hereby incorporated by reference.

BACKGROUND OF THE INVENTION

1. Field of the Invention

Exemplary embodiments of the present invention relate to a method and an apparatus for creating an avatar, and more particularly, to a method and an apparatus for creating an avatar using avatar appearance type metadata.

2. Description of Related Art

With the development of computer operation function and graphic processing capability and popularization of high-speed Internet line, various three-dimensional online games have been generalized. Further, unlike games achieving specific purposes, a 'life-type virtual reality' service that can three-dimensionally implement a real living space and thus, experience virtual reality has also been commercialized.

In particular, the life-type virtual reality service provide environment similar to real environment so as to implement real life in a virtual space. In this case, the life-type virtual reality service needs to provide a three-dimensional stereoscopic space that is similar to reality or is difficult to be searched in real environment and set various correlations between users and implement a natural user avatar.

One of factors that dominate initial impression or use satisfaction of the life-type virtual real service may include user immersion into an avatar. Generally, as a user feels that he/she is united with an avatar, the immersion and satisfaction of the corresponding service are increased. In particular, when an avatar is a center of a service, a shape of an avatar, diversity of composition, and natural action are main factors determining the user immersion into the avatar.

The avatar is created according to an appearance of an object that is a target of the avatars, such as a person, an animal, an object, or the like. That is, the avatar is created based on data regarding the appearance.

The appearance type of the general avatar includes data extracted from a portion representing the appearance of the object. For example, the appearance type of the avatar may include a plurality of children elements such as face, forehead, eyebrows, eyes, nose, cheeks, lips, teeth, chin, makeup, headtype, ears, neck, body, arms, legs, clothes, shoes, accessory, or the like. The avatar approximating a human is created using the data.

However, in generating the avatar, it is difficult to generate the avatar more approximating the reality only by data for the existing appearance. Therefore, additional data for describing more detailed appearance features are needed, in addition to the data for the existing appearance.

SUMMARY OF THE INVENTION

An embodiment of the present invention is directed to provide a method and an apparatus for creating an avatar capable of facilitating differentiation with another avatar while more approximating reality, by adding more detailed data in addition to data for an existing appearance so as to generate an avatar.

The objects of the present invention are not limited to the above-mentioned objects and therefore, other objects and advantages of the present invention that are not mentioned may be understood by the following description and will be more obviously understood by exemplary embodiments of the present invention. In addition, it can be easily appreciated that objects and advantages of the present invention may be implemented by means and a combination thereof described in claims.

According to an exemplary embodiment of the present invention, a method for creating an avatar includes: receiving information on an appearance of an object to be created into an avatar; generating avatar appearance type metadata using the information on the appearance; and creating the avatar using the avatar appearance type metadata, wherein the avatar appearance type metadata include at least one of skin information, hair information, nails information, and teeth information.

According to another exemplary embodiment of the present invention, an apparatus for creating an avatar includes: an input unit configured to receive information on an appearance of an object to be created into an avatar; a metadata generation unit configured to generate avatar appearance type metadata using the information on the appearance; and an avatar creation unit configured to create the avatar using the avatar appearance type metadata, wherein the avatar appearance type metadata include at least one of skin information, hair information, nails information, and teeth information.

DESCRIPTION OF SPECIFIC EMBODIMENTS

Exemplary embodiments of the present invention will be described below in more detail with reference to the accompanying drawings. Only portions needed to understand an operation in accordance with exemplary embodiments of the present invention will be described in the following description. It is to be noted that descriptions of other portions will be omitted so as not to make the subject matters of the present invention obscure.

Figure 1:
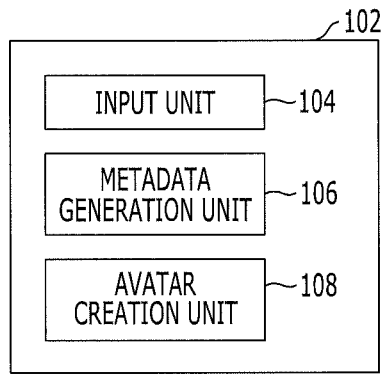
FIG. 1 is a diagram illustrating a configuration of an apparatus for creating an avatar in accordance with an exemplary embodiment of the present invention.

FIG. 1 is a diagram illustrating a configuration of an apparatus for creating an avatar in accordance with an exemplary embodiment of the present invention.

An apparatus 102 for creating an avatar is configured to include an input unit 104, a metadata generation unit 106, and an avatar creation unit 108. The input unit 104 receives information on an appearance of an object to be created into an avatar. In this case, the object includes all objects to be created into avatars such as a human, an animal, an object, or the like. The input unit 104 may receive all types of information (for example, texts, numerals, images, or the like) on an appearance of an object that is obtained by recognizing and analyzing the object.

The metadata generation unit 106 generates avatar appearance type metadata by using the information on the appearance of the avatar input to the input unit 104.

In the exemplary embodiment of the present invention, the avatar appearance type metadata may include at least one of skin information, hair information, nails information, and teeth information.

In addition, the skin information may include at least one of face skin information and body skin information, the face skin information may include at least one of skin pigment information, skin ruddiness information, skin rainbow color information, facial definition information, rosy complexion information, freckles information, wrinkles information, and face skin type information, and the body skin information may include at least one of skin pigment information, body freckles information, and wrinkles information.

In addition, the hair information may include at least one of facial hair information and body hair information, the facial hair information may include at least one of facial hair thickness information, facial sideburns information, facial moustache information, facial chin curtains information, and facial soul patch information, and the body hair information may include at least one of body hair color information and body hair thickness information.

Further, the nails information may include at least one of finger nail information and toe nail information, the finger nail information may include at least one of nail polish information and nail polish color information, and the toe nail information may include at least one of nail polish information and nail polish color information.

In addition, the teeth information may include at least one of teeth color information, brackets information, and gap information.

In addition to the above-mentioned information, the avatar appearance type metadata may further include general information on the avatar appearance, for example, information on face, forehead, eyebrows, eyes, nose, cheeks, lips, chin, makeup, headtype, ears, hair, neck, body, arms, legs, appearance resources, facial calibration points, physical condition, clothes, shoes, and accessory.

The avatar creation unit 108 creates an avatar using the avatar appearance type metadata generated by the metadata generation unit 106. The avatar creation unit 108 may create additionally using other metadata and information in addition to the avatar appearance type metadata.

Figure 2:
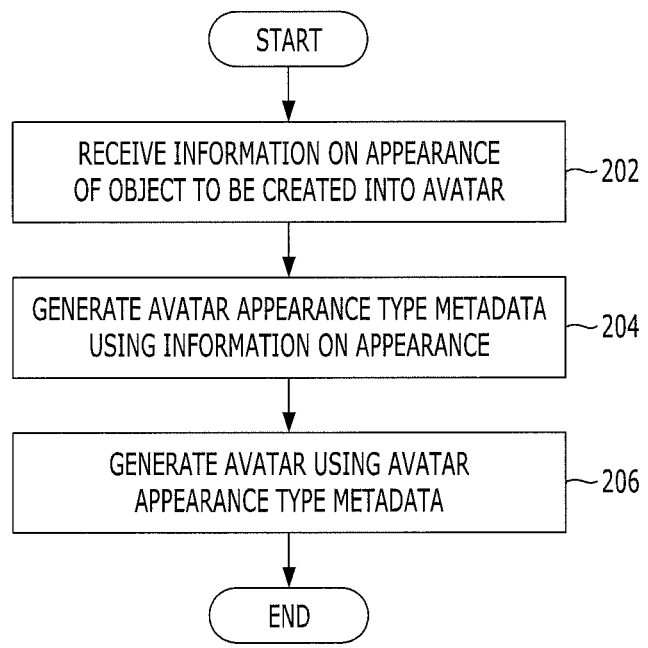
FIG. 2 is a flow chart of a method for creating an avatar in accordance with an exemplary embodiment of the present invention.

FIG. 2 is a flow chart of a method for creating an avatar in accordance with an exemplary embodiment of the present invention.

First, information on an appearance of an object to be created into an avatar is received (202). In this case, the object includes all objects to be created into avatars such as a human, an animal, an object, or the like. At step 202, all types of information (for example, texts, numerals, images, or the like) on an appearance of an object that is obtained by recognizing and analyzing the object may be received.

Then, the avatar appearance type metadata are generated by using the information on the appearance of the input avatar (204).

In the exemplary embodiment of the present invention, the avatar appearance type metadata may include at least one of skin information, hair information, nails information, and teeth information.

In addition, the skin information may include at least one of face skin information and body skin information, the face skin information may include at least one of skin pigment information, skin ruddiness information, skin rainbow color information, facial definition information, rosy complexion information, freckles information, wrinkles information, and face skin type information, and the body skin information may include at least one of skin pigment information, body freckles information, and wrinkles information.

In addition, the hair information may include at least one of facial hair information and body hair information, the facial hair information may include at least one of facial hair thickness information, facial sideburns information, facial moustache information, facial chin curtains information, and facial soul patch information, and the body hair information may include at least one of body hair color information and body hair thickness information.

Further, the nails information may include at least one of finger nail information and toe nail information, the finger nail information may include at least one of nail polish information and nail polish color information, and the toe nail information may include at least one of nail polish information and nail polish color information.

In addition, the teeth information may include at least one of teeth color information, brackets information, and gap information.

In addition to the above-mentioned information, the avatar appearance type metadata may further include general information on the avatar appearance, for example, information on face, forehead, eyebrows, eyes, nose, cheeks, lips, chin, makeup, headtype, ears, hair, neck, body, arms, legs, appearance resources, facial calibration points, physical condition, clothes, shoes, and accessory.

Finally, the avatar is generated using the avatar appearance type metadata (206). At step 206, the avatar may be created additionally using other metadata and information in addition to the avatar appearance type metadata.

As described above, the avatar appearance type metadata in accordance with the exemplary embodiment of the present invention includes a plurality of information. The information may form various structures in the avatar appearance type metadata in accordance with the exemplary embodiment of the present invention. Hereinafter, the structure of the avatar appearance type metadata in accordance with the exemplary embodiment of the present invention will be described.

First Exemplary Embodiment

Hierarchical Structure

An appearance of a human is very various and thus, describing the appearance of a human in the avatar appearance part is very important and complex purpose. However, if the appearance of a human wants to approximate possible reality, there is a need to concretely differentiate each feature.

Differentiating several features at an appropriate position provides an opportunity to make more obvious and easily change and search the appearance of a human. The differentiation according to the category is unclear at an initial stage, but will help adding and improving appearance parts in the future.

In handling avatar metadata including a large amount of describing data, in particular, the avatar appearance, there is a need to very clearly sort the appearance of a human. This makes the structure more obvious and facilitates the recognition.

The current structure does not cover all possible modifications that are likely to encounter in describing the avatar appearance. This is not likely to describe all features the appearance of the avatar and widely describes several structures. Therefore, the exemplary embodiment of the present invention is to add concreteness to the configuration.

More completely creating the avatar part describing structure makes all the avatars more clear and facilitates the understanding thereof.

In the structure of the exemplary embodiment of the present invention, differentiating in more detail several children elements is to differentiate the features of the avatar. In addition, the exemplary embodiment of the present invention separates in more detail the structures such as skin, hair, nails, or the like. In the case of the skin, the facial skin and the body skin are created into two different children elements. This is devised based on a fact in that the children elements are very different in all the describing positions and thus, there is a need to separately change the children elements.

The hair child element is divided into the facial hair and the body hair. The facial hair is prerogative of most men, such that the facial hair should not be confused with the body hair owned by all people.

The nails need to be differently managed as finger nails and toe nails.

In addition, the exemplary embodiment of the present invention adds a feature such as teeth to the current structure. The tag has attributes such as color, the presence and absence of brackets, gap, or the like.

In the exemplary embodiment of the present invention, a child element such as appearance and all the information relating to a body are added to an avatar appearance type root. Data are divided into categories such as head, neck, arms, body, or the like, in the new tag. One of the most important appearance features is a face, which is separated under a head tag.

Figure 3:
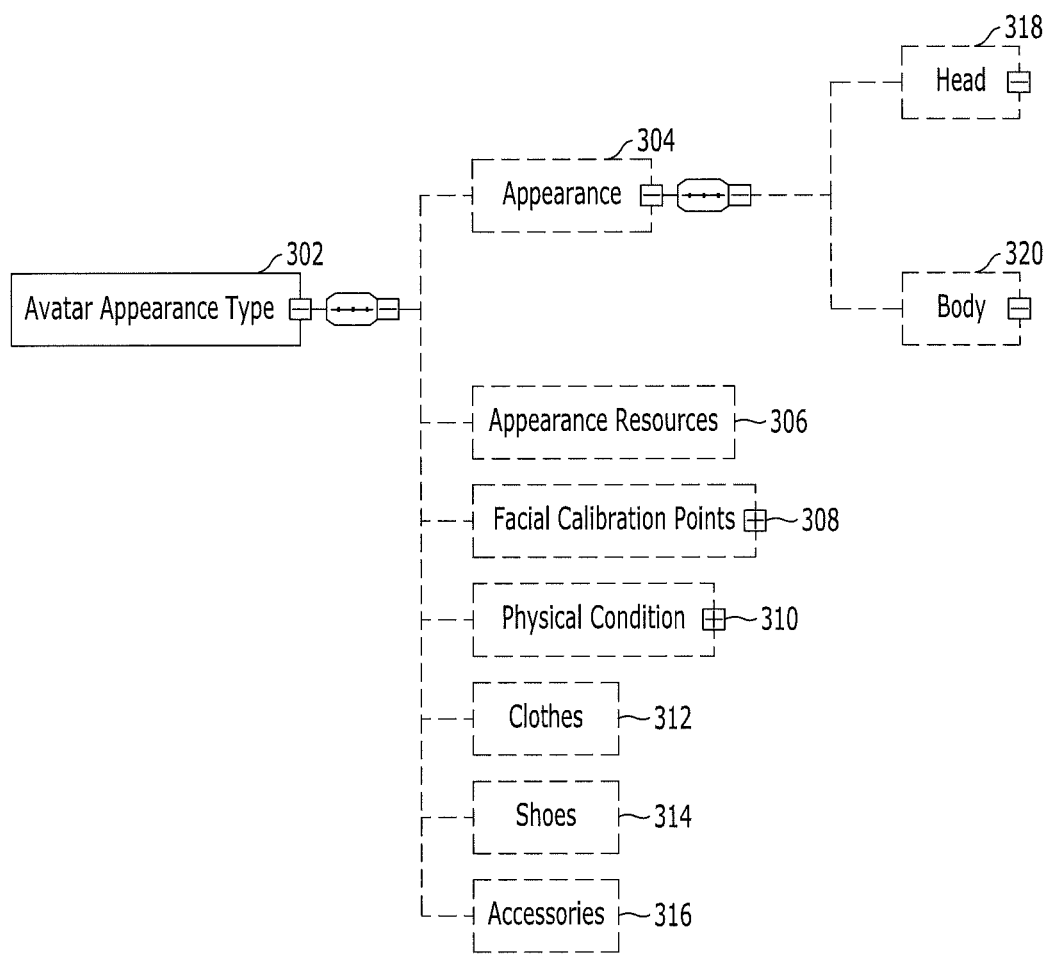
FIG. 3 is a diagram illustrating a structure of avatar appearance type metadata in accordance with a first exemplary embodiment of the present invention.
Figure 4:
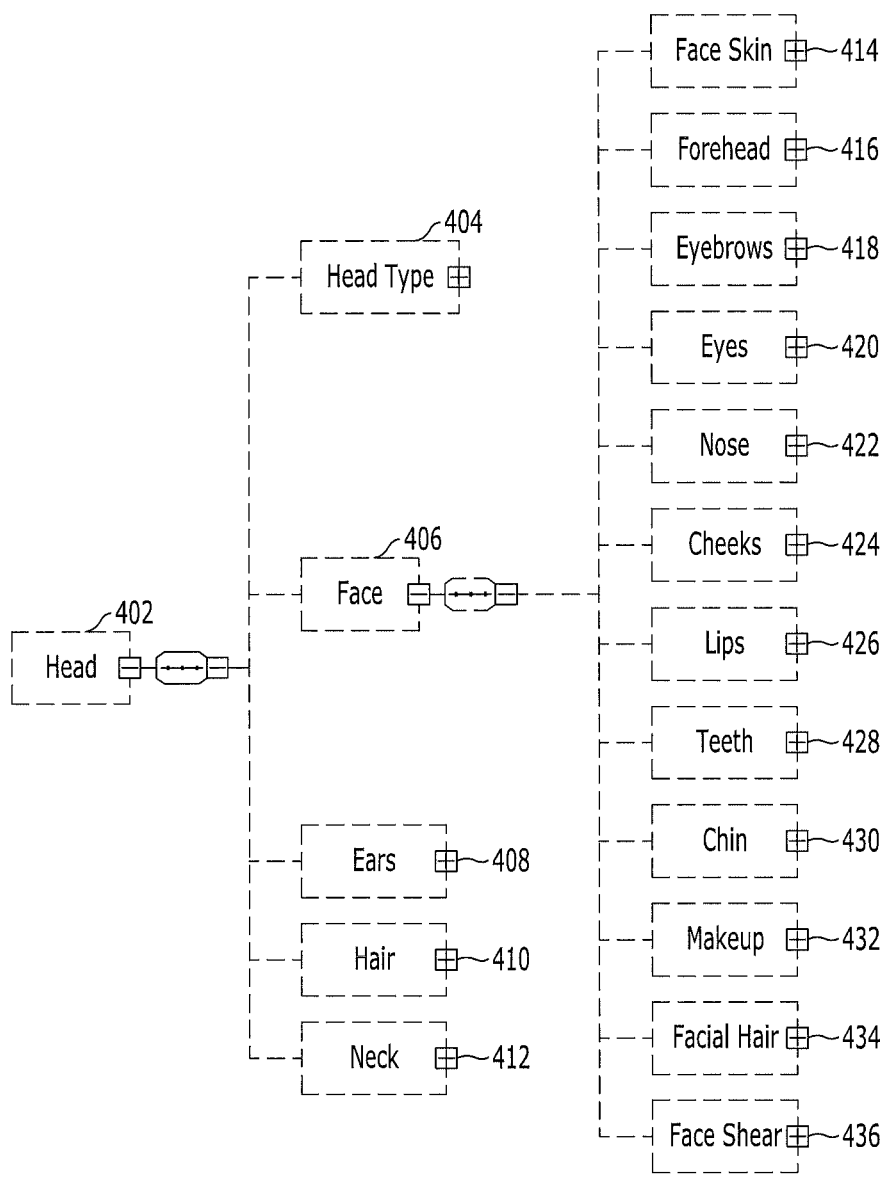
FIG. 4 is a diagram illustrating a structure of head information 318 of FIG. 3.
Figure 5:
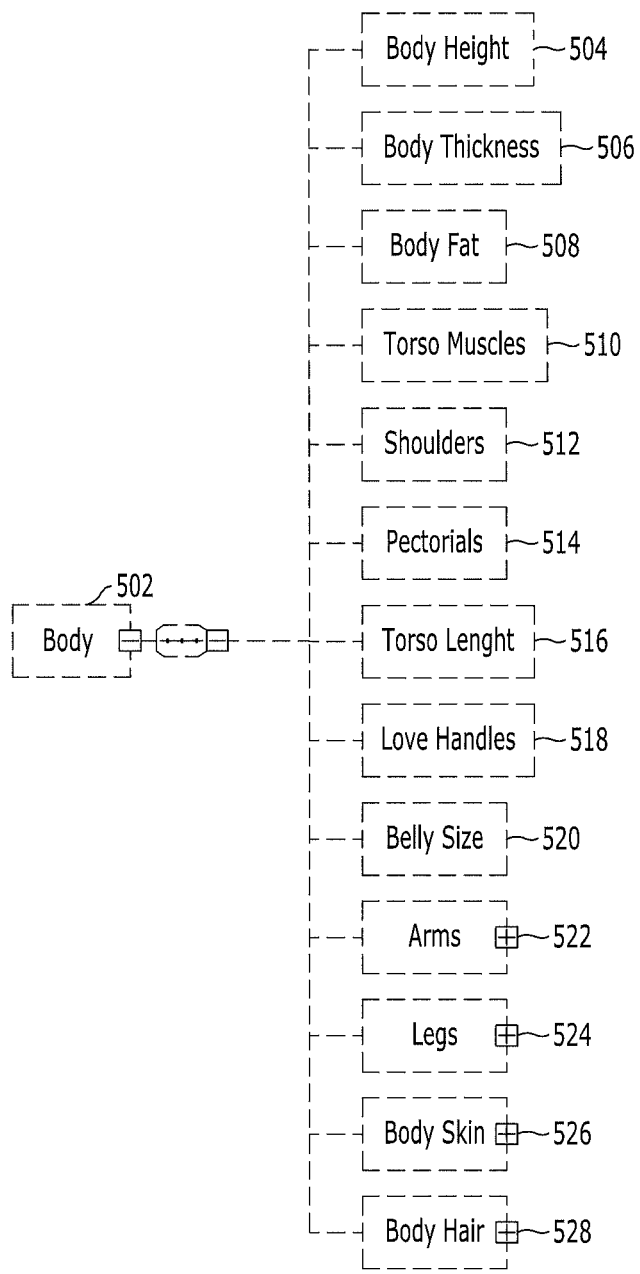
FIG. 5 is a diagram illustrating a structure of body information 320 of FIG. 3.

FIGS. 3 to 5 are diagrams illustrating the hierarchical structure of the avatar appearance type metadata in accordance with the first exemplary embodiment of the present invention.

First, the structure of the avatar appearance type metadata in accordance with the first exemplary embodiment of the present invention is illustrated. As shown in FIG. 3, an avatar appearance type metadata 302 includes appearance information 304, appearance resource information 306, facial calibration points information 308, body condition information 310, clothes information 312, shoes information 314, and accessory information 316.

The appearance information 304 describes information regarding an overall appearance of the avatar and includes head information 318 and body information 320. The head information 318 will be described below with reference to FIG. 4 and body information 502 will be described below with reference to FIG. 5.

The appearance resource information 306 represents a URL of a file including description for the avatar and generally uses an MP4 file. The facial calibration points information 308 is a set of elements that are calibration points for face feature control. The body condition information 310 includes a set of elements for describing the body condition of the avatar. The clothes information 312 is a list of virtual clothes associated with the avatar. The shoes information 314 is a list of virtual shoes associated with the avatar. The accessory information 316 is a list of objects associated with the avatar, for example, ring, glasses, or the like.

FIG. 4 is a diagram showing a structure of head information 318 of FIG. 3.

The head information 402 includes information regarding each portion included in a head of an object. Referring to FIG. 4, the head information 402 includes head type information 404, face information 406, ears information 408, hair information 410, and neck information 412. In addition, the face information 406 includes face skin information 414, forehead information 416, eyebrow information 418, eyes information 420, nose information 422, cheeks information 424, lips information 426, teeth information 428, chin information 430, makeup information 432, facial hair information 434, and facial shearing information 436.

FIG. 5 is a diagram showing a structure of body information 320 of FIG. 3.

Referring to FIG. 5, the body information 520 includes body height information 504, body thickness information 506, body fatness information 508, body muscle information 510, shoulder information 512, pectoral information 514, body length information 516, love handle information 518, abdominal muscle size information 520, arms information 522, legs information 524, body skin information 526, and body hair information 528.

A schema of the avatar appearance type metadata in accordance with the first exemplary embodiment of the present invention is as follows.

Semantics of each element through FIGS. 3 to 5 will be described below with reference to Tables 1 to 29.

TABLE 1

Set of descriptions for appearance of the avatar

| (HeadType) | Name | Description |
| --- | --- | --- |
| | HeadType | A type that describes avatar head. |
| | HeadSize | Size of the entire head (small, medium, big) |
| | HeadStrech | Vertical stretch of the head in % |
| | HeadShape | This can be one of "square", "round", "oval" or "long" |
| | EggHead | Head is larger on the top than on the bottom or vice versa. This can be "yes" or "not" |
| | HeadLength | The distance between the face and the back of the head, flat head or long head, measured in meters |

TABLE 2

Set of descriptions for body of the avatar

| (Body) | Name | Description |
| --- | --- | --- |
| | BodyType | A type that describes avatar body. |
| | BodyHeight | Full height of the character (always in meter) |
| | BodyThickness | This indicates the weight of the bounding box of the avatar (always in meter) |
| | BodyFat | This should be one of Low, Medium, High and indicates the fatness of the body |
| | TorsoMuscles | This should be one of Low, Medium, High and indicates the average muscularity of the avatar's body |
| | Shoulders | The width of the shoulders (always in meter) |
| | Pectorials | The size of the pectoral muscles (always in meter) |

TABLE 2-continued

Set of descriptions for body of the avatar

| (Body) | Name | Description |
|---|---|---|
| | TorsoLength | The length of torso (between pectorals and legs) (always in meter) |
| | LoveHandles | Size of the love handles (always in meter) |
| | BellySize | Diameter of the belly (always in meter) |

TABLE 3

Set of elements for arms avatar description. Containing elements:

| (Arms) | Name | Description |
|---|---|---|
| | ArmType | A type that describes avatar arms. |
| | ArmLength | Length of complete arm (always in meter) |
| | HandSize | Size of the whole hand including fingers (always in meter) |

TABLE 4

Set of descriptions for legs of the avatar

| (Legs) | Name | Description |
|---|---|---|
| | LegsType | A type that describes avatar legs. |
| | HipWidth | The width of the hip area (always in meter) |
| | HipLength | The vertical size of the hip area (always in meter) |
| | ButtSize | Diameter of the butt's avatar (always in meter) |
| | Package | Size of the package (small, medium, big) |
| | SaddleBags | Volume of saddle bags (small, medium, big) |
| | KneeAngle | The angle between the upper end lower leg, normally 0 when they are aligned (in degrees, from 0 to 360) |
| | FootSize | Size of the whole foot including toes (always in meter) |
| | LegMucles | Size of all leg muscles (always in meter) |
| | LegLength | Length of complete leg (always in meter) |

TABLE 5

Set of descriptions for facial skin of the avatar

| (Face Skin) | Name | Description |
|---|---|---|
| | FaceSkinType | A type that describes avatar skin. |
| | SkinPigment | Skin Pigment (very light, light, average, olive, brown, black) |
| | SkinRuddiness | Skin Ruddiness (few, medium, lot) |
| | SkinRainbowColor | Skin Rainbow color (RGB) |
| | FacialDefinition | Level of brightness of the face from 1-lighted to 5 dark |
| | RosyComplexion | Rosy Complexion (yes or no) |
| | Freckles | Freckles (5 levels, 1 = smallest, 5 = biggest) |
| | Wrinkles | Wrinkles (yes or no) |

TABLE 5-continued

Set of descriptions for facial skin of the avatar

| (Face Skin) | Name | Description |
|---|---|---|
| | FaceSkinType | Describe the type of face skin (dry, normal, greasy) |

TABLE 6

Set of descriptions for body skin of the avatar

| (Body Skin) | Name | Description |
|---|---|---|
| | BodySkinType | A type that describes avatar skin. |
| | SkinPigment | Body Skin Pigment (very light, light, average, olive, brown, black) |
| | BodyFreckles | Body Freckles (5 levels, 1 = smallest, 5 = biggest) |
| | Wrinkles | Wrinkles (yes or no) |

TABLE 7

Set of descriptions for face of the avatar

| (Face) | Name | Description |
|---|---|---|
| | FaceType | A type that describes avatar face. |
| | FaceShear | Changes the height difference between the two sides of the face (always in meter) |

TABLE 8

Set of descriptions for ears of the avatar

| (Ears) | Name | Description |
|---|---|---|
| | EarsType | A type that describes avatar ears. |
| | EarSize | Size of the entire ear (always in meter) |
| | EarPosition | Vertical ear position on the head (down, middle, up) |
| | EarAngle | The angle between the ear and the head in degrees |
| | AttachedEarlobes | The size of the earlobes (always in meter) |
| | EarTips | How much the ear tips are pointed (pointed, medium, not pointed) |
| | hapticIDRef | Identifier that refers to the haptic properties of the ears. |

TABLE 9

Set of descriptions for neck of the avatar

| (Neck) | Name | Description |
|---|---|---|
| | NeckType | A type that describes avatar neck. |
| | NeckThickness | The diameter of the neck (always in meter) |
| | NeckLength | The height of the neck (always in meter) |

TABLE 10

Set of descriptions for hair of the avatar

| (Hair) | Name | Description |
|---|---|---|
| | HairType | A type that describes avatar hair. |
| | HairType | A type that describes avatar hair. |
| | HairSize | The length of the hair (can be one of short, medium or long) |
| | HairStyle | The style of the hair (free text) |
| | HairColor | The hair color (RGB) |
| | WhiteHair | Amount of white hair (%) |
| | RainbowColor | The color of the hair (RGB) |
| | BlondeHair | How much blond is the hair (%) |
| | RedHair | How much red is the hair (%) |
| | HairVolume | The volume of the complete hair (small, medium or big) |
| | HairFront | How much the hair goes toward front (short, medium or long) |
| | HairSides | The height of the sides of the hair (short, medium or long) |
| | HairBack | How long is the hair at the back (short, medium or long) |
| | BigHairFront | How high is the hair at the front of the skull (short, medium or long) |
| | BigHairTop | How high is the hair at the top of the skull (short, medium or long) |
| | BigHairBack | How high is the hair at the back of the skull (short, medium or long) |
| | FrontFringe | The length of the front fringe of the hair (short, medium or long) |
| | SideFringe | The length of the side fringe of the hair (short, medium or long) |
| | BackFringe | The length of the back fringe of the hair (short, medium or long) |
| | FullHair Sides | The width of the hair (short, medium or long) |
| | HairSweep | How much the hair is turned towards the front (left, middle, right) |
| | ShearFront | How much the hair extends towards front (short, medium or long) |
| | ShearBack | How much the hair extends towards back (short, medium or long) |
| | TuperFront | The width of the hair at the front (short, medium or long) |
| | TuperBack | The width of the hair on the back (short, medium or long) |
| | Rumpledhair | How much the hair is rumpled (low, moderate or high) |
| | Pigtails | The length of the pigtails (short, medium or long) |
| | Ponytail | The length of the ponytail (short, medium or long) |
| | SpikedHair | The length of the spikes in the hair (short, medium or long) |
| | HairTilt | The vertical position of the hair from the top of the head (m) |
| | HairMiddlePart | How much the hair is parted at the middle front (low, high) |
| | HairRightPart | How much the hair is parted at the right side (low, high) |
| | HairLeft Part | How much the hair is parted at the left side (low, high) |
| | HairPart Bangs | How much the hair is parted at the middle (low, high) |
| | hapticID Ref | Identifier that refers to the haptic properties of the hair. |

TABLE 11

Set of descriptions for finger nails of the avatar

| (Fingernail) | Name | Description |
|---|---|---|
| | NailType | A type that describes avatar nail. |
| | NailPolish | Nail Polish (yes or no) |
| | NailPolishColor | Nail Polish Color (RGB) |

TABLE 12

Set of descriptions for toe nails of the avatar

| (Toenail) | Name | Description |
|---|---|---|
| | NailType | A type that describes avatar nail. |
| | NailPolish | Nail Polish (yes or no) |
| | NailPolishColor | Nail Polish Color (RGB) |

TABLE 13

Set of descriptions for forehead of the avatar

| (Forehead) | Name | Description |
|---|---|---|
| | ForeheadType | A type that describes avatar forehead. |
| | ForeheadSize | The height of the forehead measured in meters |
| | ForeheadAngle | The angle of the forehead measured in degrees |

TABLE 14

Set of descriptions for eyebrows of the avatar

| (Eyebrows) | Name | Description |
|---|---|---|
| | EyebrowsType | A type that describes avatar eyebrows. |
| | EyebrowSize | The length of the eyebrow (short, medium, long) |
| | EyebrowDensity | The density (low, moderate, high) |
| | EyebrowHeight | The vertical eyebrow position on the face (low, middle, high) |
| | EyebrowArc | The curvature of the Eyebrow. It can be low (flat), middle or high (arced) |
| | EyebrowPoints | The direction of the eyebrows, towards up or down (down, middle, up) |

TABLE 15

Set of descriptions for eyes of the avatar

| (Eyes) | Name | Description |
|---|---|---|
| | EyesType | A type that describes avatar eyes. |
| | EyeSize | The size of the entire eyes (always in meter) |
| | EyeOpening | How much the eyelids are opened (always in meter) |
| | EyeSpacing | Distance between the eyes (always in meter) |
| | OuterEyeCorner | Vertical position of the outer eye corner (down, middle, up) |
| | InnerEyeCorner | Vertical position of the inner eye corner (down, middle, up) |
| | EyeDepth | How much the eyes are inside the head (always in meter) |

TABLE 15-continued

Set of descriptions for eyes of the avatar

| (Eyes) | Name | Description |
|---|---|---|
| | UpperEyelidFold | How much the upper eyelid covers the eye (always in meter) |
| | EyeBags | The size of the eye bags (always in meter) |
| | PuffyEyelids | The volume of the eye bags (small, medium, big) |
| | EyelashLength | The length of the eyelashes (always in meter) |
| | EyePop | The size difference between the left and right eye (always in meter) |
| | EyeColor | The eye colour (RGB) |
| | EyeLightness | The reflectivity of the eye in % |

TABLE 16

Set of descriptions for nose of the avatar

| (Nose) | Name | Description |
|---|---|---|
| | NoseType | A type that describes avatar nose. |
| | NoseSize | The height of the nose from its bottom (always in meter) |
| | NoseWidth | The width of the complete nose (always in meter) |
| | NostrillWidth | Width of only the nostrils (always in meter) |
| | NostrillDivision | The size of the nostril division (always in meter) |
| | NoseThickness | The size of the tip of the nose (always in meter) |
| | UpperBridge | The height of the upper part of the nose (always in meter) |
| | LowerBridge | The height of the lower part of the nose (always in meter) |
| | BridgeWidth | The width of the upper part of the nose (always in meter) |
| | NoseTipAngle | The angle of the nose tip, "up" or "down" |
| | NoseTipShape | The shape of the nose tip, "pointy" or "bulbous" |
| | CrookedNose | Displacement of the nose on the left or right side |

TABLE 17

Set of descriptions for cheeks of the avatar

| (Cheeks) | Name | Description |
|---|---|---|
| | CheeksType | A type that describes avatar cheeks. |
| | Cheeks | The size of the complete cheeks (small, medium, big) |
| | CheeksDepth | The depth of the complete cheeks (always in meter) |
| | CheeksShape | Different cheeks shapes (one of the following values: chubby, high, bone) |
| | UpperCheeks | The volume of the upper cheeks (small, medium, big) |
| | LowerCheeks | The volume of the lower cheeks (small, medium, big) |
| | CheekBones | The vertical position of the cheek bones (down, medium, up) |
| | Dimples | The dimples (yes or no) |

TABLE 18

Set of descriptions for lips of the avatar

| (Lips) | Name | Description |
|---|---|---|
| | LipsType | A type that describes avatar lips. |
| | LipWidth | The width of the lips (m) |
| | LipFullness | The fullness of the lip (m) |
| | LipThickness | The thickness of the lip (m) |
| | LipRatio | Difference between the upper and lower lip (m) |
| | MouthSize | The size of the complete mouth (m) |
| | MouthPosition | Vertical position of the mouth on the face (m) |
| | MouthCorner | Vertical position of the mouth corner (down, middle, up) |
| | LipCleftDepth | The height of the lip cleft (m) |
| | LipCleft | The width of the lip cleft (m) |
| | ShiftMouth | Horizontal position of mouth on the face (left, middle, right) |
| | LipPinkness | Lip Pinkness (5 levels, 1 = smallest, 5 = biggest) |

TABLE 19

Set of descriptions for teeth of the avatar

| (Teeth) | Name | Description |
|---|---|---|
| | TeethType | A type that describes avatar teeth. |
| | TeethColor | The colour of teeth (RGB) |
| | Brackets | Brackets (yes or no) |
| | Gap | Gaps between teeth (yes or no) |

TABLE 20

Set of descriptions for chin of the avatar

| (Chin) | Name | Description |
|---|---|---|
| | ChinType | A type that describes avatar chin. |
| | ChinAngle | The curvature of the chin, outer or inner |
| | JawShape | Pointy to Square jaw (pointed, middle, not pointed) |
| | ChinDepth | Vertical height of the chin (m) |
| | JawAngle | The height of the jaw (m) |
| | JawJut | Position of the jaw inside or out of the face (inside, outside) |
| | Jowls | The size of the jowls (m) |
| | ChinCleft | The shape of the chin cleft, "round" or "cleft" |
| | UpperChinCleft | The shape of the upper chin cleft, "round" or "cleft" |
| | ChinNeck | The size of the chin neck (m) |

TABLE 21

Set of descriptions for makeup of the avatar

| (Makeup) | Name | Description |
|---|---|---|
| | MakeupType | A type that describes avatar makeup. |
| | Lipstick | Lipstick (yes or no) |
| | LipstickColor | Lipstick Color (RGB) |
| | Lipgloss | Lip gloss (5 levels, 1 = smallest, 5 = biggest) |
| | Blush | Blush (yes or no) |

TABLE 21-continued

Set of descriptions for makeup of the avatar

| (Makeup) | Name | Description |
|---|---|---|
| | BlushColor | Blush Color (RGB) |
| | BlushOpacity | Blush Opacity (%) |
| | InnerShadow | Inner Shadow (yes or no) |
| | InnerShadowColor | Inner Shadow Color (RGB) |
| | InnerShadowOpacity | Inner Shadow Opacity (%) |
| | OuterShadow | Outer Shadow (yes or no) |
| | OuterShadowOpacity | Outer Shadow Opacity (%) |
| | Eyeliner | Eyeliner (yes or no) |
| | EyelinerColor | Eyeliner Color (RGB) |

TABLE 22

Set of descriptions for Facial Hair of the avatar

| (FacialHair) | Name | Description |
|---|---|---|
| | FacialHairType | A type that describes avatar facial hair. |
| | FacialHairThickness | The thick of the facial hair (low, middle, high) |
| | FacialSideBurns | The color of the facial side (RGB) |
| | FacialMoustache | The facial moustache (yes or no) |
| | FacialchinCurtains | Facial chin curtains (yes or no) |
| | FacialSoulPatch | Facial soul patch (yes or no) |
| | FacialHairThickness | The thick of the facial hair (low, middle, high) |

TABLE 23

Set of descriptions for Facial Hair of the avatar

| (BodyHair) | Name | Name |
|---|---|---|
| | BodyHairColour | The color of the hair (RGB) |
| | BodyHairThickness | The thick of the body hair (low, middle, high) |

TABLE 24

Figure 7:
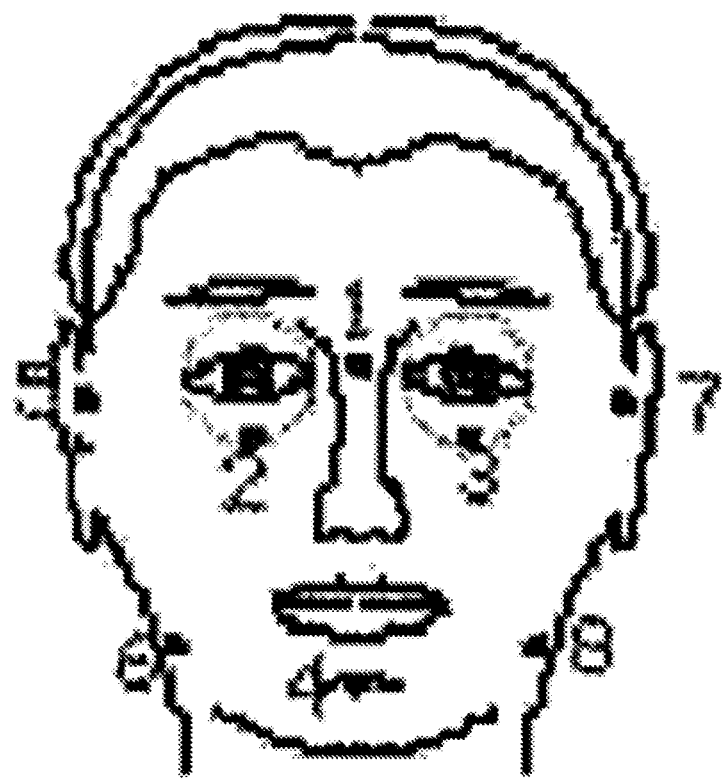
FIG. 7 is a human head illustrating a facial calibration points information which is a set of elements that are calibration points for face feature control.

| Name | Description |
|---|---|
| (FacialCalibrationPoints) | Set of elements that are calibration points for the face feature control. NameDescriptionFacialCalibrationPointsTypeA type that describes calibration points for face feature control. Sellion3D position (meter), point 1 in the FIG. 7 at the bottomRInfraorbitale3D position (meter), point 2 in the FIG. 7 at the bottom LInfraorbitale3D position (meter), point 3 in the FIG. 7 at the bottomSupramenton3D position (meter), point 4 in the FIG. 7 at the bottomRTragion3D position (meter), point 5 in the FIG. 7 at the bottomRGonion3D position (meter), point 6 in the FIG. 7 at the bottomLTragion3D position (meter), point 7 in the FIG. 7 at the bottomLGonion3D position (meter), point 8 in the FIG. 7 at the bottom. |

NOTE:
The calibration points are to be used for mapping a captured face feature points onto an arbitrary face of an avatar.

TABLE 25

| Name | Description |
|---|---|
| (PhysicalConditionType) | A type that describes the physical condition of the avatar. |
| BodyStrength | Avatar body strength (unlimited percentage (%)) |
| BodyFlexibility | Avatar body flexibility with descriptive scale of low, medium, and high |

TABLE 26

| Name | Description |
|---|---|
| (Clothes) | A list of virtual clothes which are associated to the avatar. The type of this element is VirtualObjectType |

TABLE 27

| Name | Description |
|---|---|
| (Shoes) | A list of virtual shoes which are associated to the avatar. The type of this element is VirtualObjectType |

TABLE 28

| Name | Description |
|---|---|
| (Accessories) | A list of objects (ring, glasses, . . .) which are associated to the avatar. The type of this element is VirtualObjectType |

TABLE 29

| Name | Description |
|---|---|
| (AppearanceResources) | URL to file with avatar description, usually MP4 file. |

Second Exemplary Embodiment

Flat Structure

Figure 6:
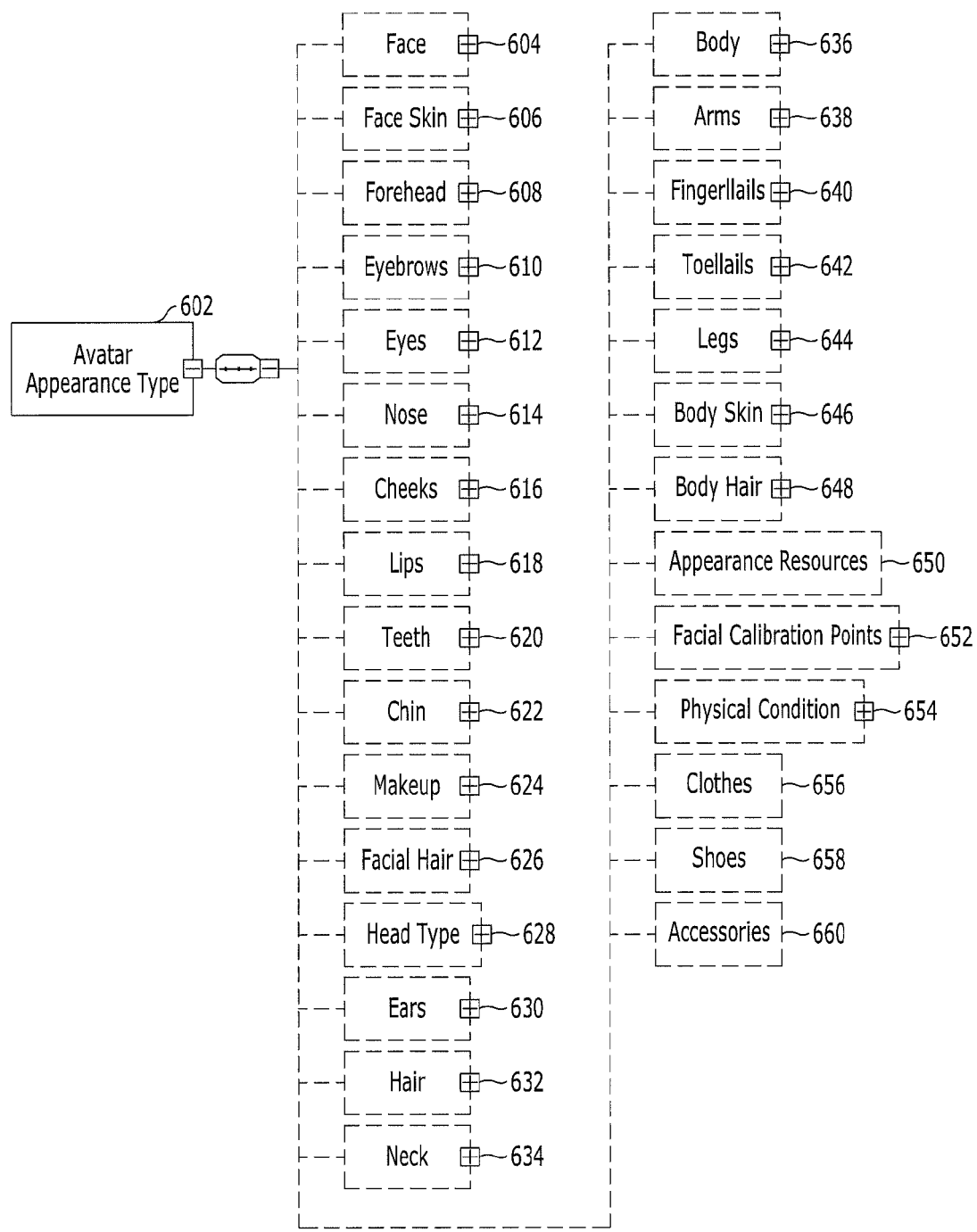
FIG. 6 is a diagram illustrating a structure of avatar appearance type metadata in accordance with a second exemplary embodiment of the present invention.

FIG. 6 is a diagram illustrating a structure of avatar appearance type metadata in accordance with a second exemplary embodiment of the present invention.

Referring to FIG. 6, an avatar appearance type metadata 602 in accordance with the second exemplary embodiment of the present invention includes all the elements from a face 604 to an accessory 660. Unlike the first exemplary embodiment of the present invention, the elements included in the avatar appearance type metadata according to the second exemplary embodiment of the present invention has a flat structure, rather than a hierarchical structure. In other words, each element according to the second exemplary embodiment of the present invention is configured to have a level equivalent to each other. The elements of the accessory 660 in the face 604 included in the avatar appearance type metadata 602 has the same semantics as the elements described with reference to FIGS. 3 to 5 and the detailed description thereof will be described.

A schema of the avatar appearance type metadata in accordance with the second exemplary embodiment of the present invention is as follows.

Meanwhile, the semantics of the elements of accessory 660 in the face 604 included in the avatar appearance type metadata 602 of FIG. 6 are shown in Tables 1 to 29 and therefore, the detailed description thereof will be omitted.

As set forth above, the exemplary embodiments of the present invention can create the avatar capable of facilitating the differentiation with another avatar while more approximating the reality, by adding more detailed appearance data (skin (face and body), hair (face and body), nails (hands and feet)) in addition to the data for the existing appearance so as to generate the avatar.

While the present invention has been described with respect to the specific embodiments, it will be apparent to those skilled in the art that various changes and modifications may be made without departing from the spirit and scope of the invention. Accordingly, the scope of the invention is not limited to exemplary embodiments as described above and is defined by the following claims and equivalents to the scope the claims.

What is claimed is:

1. A method for creating an avatar, comprising:
   receiving information on an appearance of an object to be created into an avatar;
   generating avatar appearance type metadata using the information on the appearance; and
   creating the avatar using the avatar appearance type metadata after generating the avatar appearance type metadata,
   wherein the avatar appearance type metadata include skin information, hair information, nails information, teeth information, and expression information to show the appearance, and
   wherein the expression information includes an appearance resource information which represents a URL of a file including a description for the avatar, a facial calibration points information which is a set of elements that are calibration points for face feature control, and a body condition information which includes a set of elements for describing the body condition of the avatar like body strength and body flexibility.

2. The method of claim 1, wherein the skin information includes at least one of face skin information and body skin information.

3. The method of claim 2, wherein the face skin information includes at least one of skin pigment information, skin ruddiness information, skin rainbow color information, facial definition information, rosy complexion information, freckles information, wrinkles information, and face skin type information.

4. The method of claim 2, wherein the body skin information includes at least one of skin pigment information, body freckles information, and wrinkles information.

5. The method of claim 1, wherein the hair information includes at least one of facial hair information and body hair information.

6. The method of claim 5, wherein the facial hair information includes at least one of facial hair thickness information, facial sideburns information, facial moustache information, facial chin curtains information, and facial soul patch information.

7. The method of claim 5, wherein the body hair information includes at least one of body hair color information and body hair thickness information.

8. The method of claim 1, wherein the nails information includes at least one of finger nail information and toe nail information.

9. The method of claim 8, wherein the finger nail information includes at least one nail polish information and nail polish color information.

10. The method of claim 8, wherein the toe nail information includes at least of nail polish information and nail polish color.

11. The method of claim 1, wherein the teeth information includes at least one of teeth color information, brackets information, and gap information.

12. An apparatus for creating an avatar, comprising:
    a receiver configured to receive information on an appearance of an object to be created into an avatar;
    a processor configured to generate avatar appearance type metadata using the information on the appearance; and
    configured to create the avatar using the avatar appearance type metadata after generating the avatar appearance type metadata,
    wherein the avatar appearance type metadata include skin information, hair information, nails information, teeth information, and expression information to show the appearance, and
    wherein the expression information includes an appearance resource information which represents a URL of a file including a description for the avatar, a facial calibration points information which is a set of elements that are calibration points for face feature control, and a body condition information which includes a set of elements for describing the body condition of the avatar like body strength and body flexibility.

13. The apparatus of claim 12, wherein the skin information includes at least one of face skin information and body skin information.

14. The apparatus of claim 13, wherein the face skin information includes at least one of skin pigment information, skin ruddiness information, skin rainbow color information, facial definition information, rosy complexion information, freckles information, wrinkles information, and face skin type information.

15. The apparatus of claim 13, wherein the body skin information includes at least one of skin pigment information, body freckles information, and wrinkles information.

16. The apparatus of claim 12, wherein the hair information includes at least one of facial hair information and body hair information.

17. The apparatus of claim 16, wherein the facial hair information includes at least one of facial hair thickness information, facial sideburns information, facial moustache information, facial chin curtains information, and facial soul patch information.

18. The apparatus of claim 16, wherein the body hair information includes at least one of body hair color information and body hair thickness information.

19. The apparatus of claim 12, wherein the nails information includes at least one of finger nail information and toe nail information.

20. The apparatus of claim 19, wherein the finger nail information includes at least one nail polish information and nail polish color information.

21. The apparatus of claim 19, wherein the toe nail information includes at least of nail polish information and nail polish color.

22. The apparatus of claim 12, wherein the teeth information includes at least one of teeth color information, brackets information, and gap information.

* * * * *